United States Patent
Lee et al.

(10) Patent No.: US 7,283,085 B2
(45) Date of Patent: Oct. 16, 2007

(54) SYSTEM AND METHOD FOR EFFICIENT, HIGH-RESOLUTION MICROWAVE IMAGING USING COMPLEMENTARY TRANSMIT AND RECEIVE BEAM PATTERNS

(75) Inventors: Gregory Steven Lee, Mountain View, CA (US); Robert C. Taber, Palo Alto, CA (US); Izhak Baharav, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 191 days.

(21) Appl. No.: 11/088,536

(22) Filed: Mar. 24, 2005

(65) Prior Publication Data

US 2006/0214832 A1    Sep. 28, 2006

(51) Int. Cl.
*H01Q 15/00*    (2006.01)
*H01Q 3/00*    (2006.01)

(52) U.S. Cl. .................... 342/6; 342/372; 342/376
(58) Field of Classification Search ............. 342/179, 342/176, 180
See application file for complete search history.

(56) References Cited

U.S. PATENT DOCUMENTS

| | | | |
|---|---|---|---|
| 3,842,417 A * | 10/1974 | Williams | 342/158 |
| 4,015,266 A * | 3/1977 | Borowick | 343/815 |
| 4,336,540 A * | 6/1982 | Goodwin et al. | 342/157 |
| 4,502,025 A | 2/1985 | Carl, Jr. et al. | |
| 4,649,393 A | 3/1987 | Rittenbach | |
| 4,885,592 A | 12/1989 | Kofol et al. | |
| 4,910,523 A * | 3/1990 | Huguenin et al. | 342/179 |
| 5,027,125 A | 6/1991 | Tang | |
| 5,170,170 A | 12/1992 | Soumekh | |
| 5,365,237 A | 11/1994 | Johnson et al. | |
| 5,905,473 A * | 5/1999 | Taenzer | 343/834 |
| 5,940,030 A | 8/1999 | Hampel et al. | |
| 5,940,045 A | 8/1999 | Belcher et al. | |
| 5,982,326 A * | 11/1999 | Chow et al. | 342/365 |
| 5,986,590 A | 11/1999 | Smith et al. | |
| 6,037,908 A | 3/2000 | Phillips et al. | |
| 6,043,786 A | 3/2000 | Vannatta et al. | |
| 6,057,761 A | 5/2000 | Yukl | |
| 6,067,048 A * | 5/2000 | Yamada | 342/382 |
| 6,242,740 B1 | 6/2001 | Luukanen et al. | |
| 6,353,224 B1 | 3/2002 | Sinclair et al. | |

(Continued)

OTHER PUBLICATIONS

David M.Sheen et al.; "Three-Dimensional Millimeter-Wave Imaging for Concealed Weapon Detection"; IEEE Transactions On Microwave Theory And Techniques, vol. 49, No. 9, Sep. 2001, pp. 1581-1592.

(Continued)

*Primary Examiner*—Thomas H. Tarcza
*Assistant Examiner*—Shelley Chen

(57) ABSTRACT

A scanning panel for use in a microwave imaging system captures a microwave image of a target using two complementary arrays of antenna elements. Each of the antenna elements in a first array is capable of being programmed with a respective phase delay to direct a transmit beam of microwave illumination toward the target in a transmit beam pattern, and each of the antenna elements in a second array is capable of receiving reflected microwave illumination reflected from the target in a receive beam in a receive beam pattern complementary to the transmit beam pattern. The microwave image of the target is formed at an intersection between the transmit beam and the receive beam.

22 Claims, 8 Drawing Sheets

U.S. PATENT DOCUMENTS

| | | |
|---|---|---|
| 6,501,414 B2 | 12/2002 | Amdt et al. |
| 6,549,166 B2 | 4/2003 | Bhattacharyya et al. |
| 6,642,889 B1 | 11/2003 | McGrath |
| 6,894,653 B2 * | 5/2005 | Chiang et al. ............... 343/757 |
| 6,965,340 B1 * | 11/2005 | Baharav et al. ............... 342/22 |
| 6,970,133 B2 * | 11/2005 | Chandler ............. 343/700 MS |
| 2003/0034916 A1 | 2/2003 | Kwon et al. |
| 2004/0056790 A1 | 3/2004 | Lovberg et al. |
| 2004/0080448 A1 | 4/2004 | Lovberg et al. |
| 2004/0246183 A1 * | 12/2004 | Chandler .................... 343/700 |
| 2006/0109174 A1 * | 5/2006 | Baharav et al. ............. 342/179 |
| 2006/0119513 A1 * | 6/2006 | Lee ............................ 342/374 |
| 2006/0214832 A1 * | 9/2006 | Lee et al. ..................... 342/22 |
| 2006/0214833 A1 * | 9/2006 | Baharav et al. ................ 342/22 |
| 2006/0214834 A1 * | 9/2006 | Baharav et al. ................ 342/22 |
| 2006/0214835 A1 * | 9/2006 | Lee et al. ..................... 342/22 |
| 2006/0214836 A1 * | 9/2006 | Baharav et al. ................ 342/22 |

OTHER PUBLICATIONS

P.F. Goldsmith, et al.; "Focal Plane Imaging Systems for Millimeter Wavelengths"; IEEE Transactions on Microwave Theory And Techniques, vol. 41, No. 10, Oct. 1993, pp. 1664-1675.

Tatsuo Nozokido, et al.; "Scanning Near-Field Millimeter-Wave Microscopy Using a Metal Slit as a Scanning Probe"; IEEE Transactions On Microwave Theory And Techniques, vol. 49, No. 3, Mar. 2001, pp. 491-499.

* cited by examiner

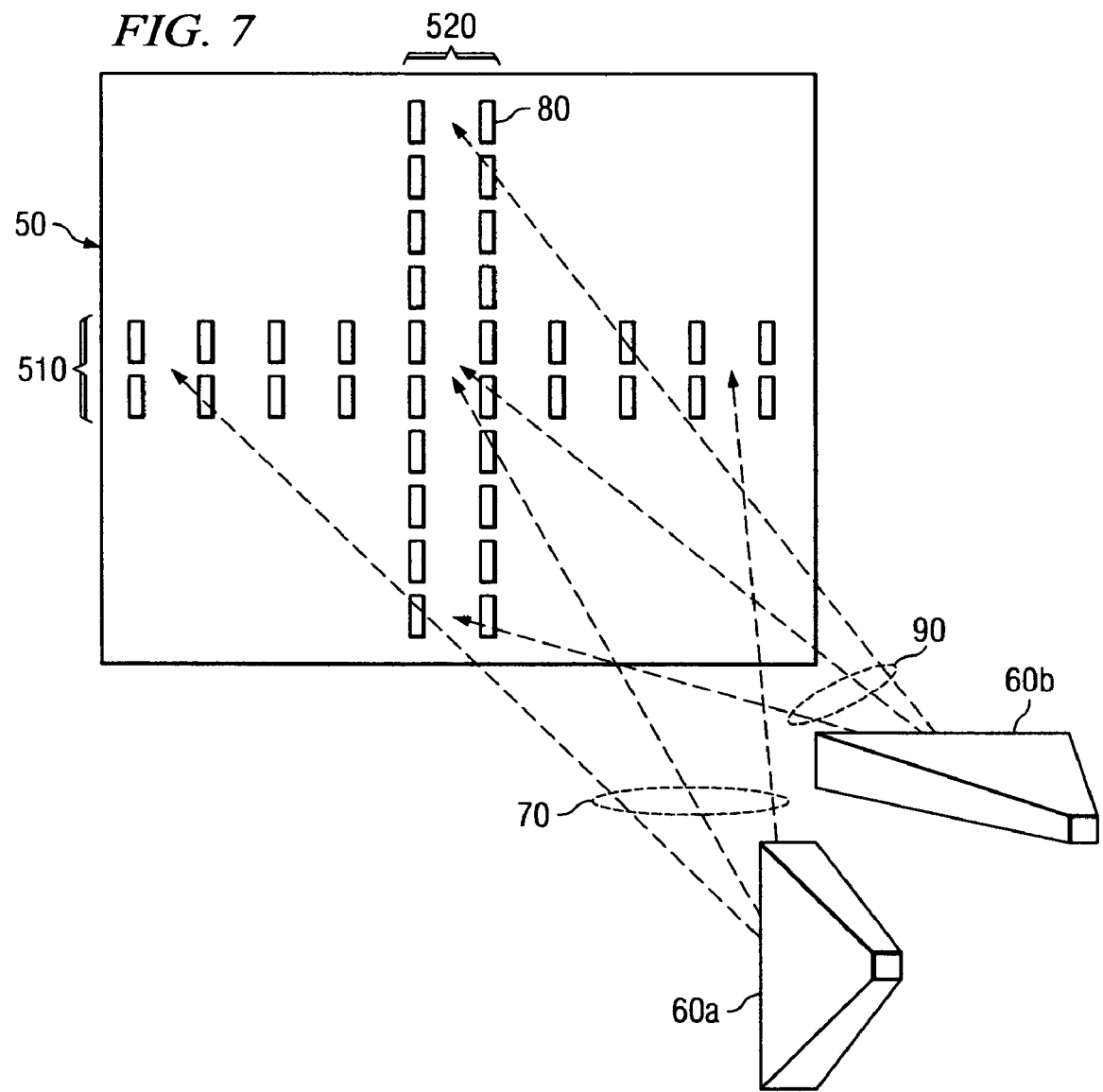

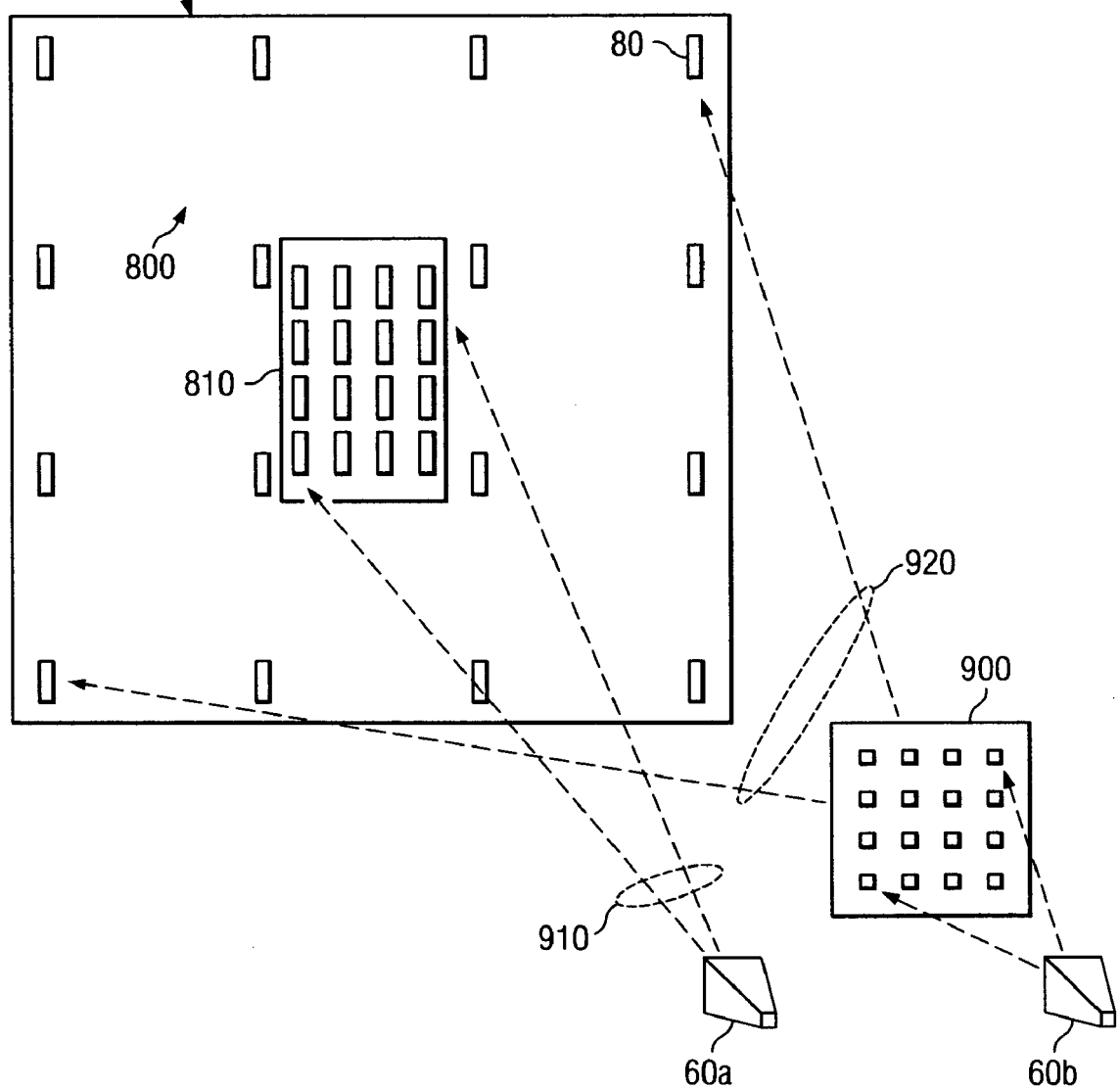

SYSTEM AND METHOD FOR EFFICIENT, HIGH-RESOLUTION MICROWAVE IMAGING USING COMPLEMENTARY TRANSMIT AND RECEIVE BEAM PATTERNS

CROSS-REFERENCE TO RELATED APPLICATIONS

This application is related by subject matter to U.S. patent application Ser. No. 10/997,422, entitled "A Device for Reflecting Electromagnetic Radiation," U.S. patent application Ser. No. 10/997,583, entitled "Broadband Binary Phased Antenna," and U.S. Pat. No. 6,965,340, entitled "System and Method for Security Inspection Using Microwave Imaging" all of which were filed on Nov. 24, 2004.

This application is further related by subject matter to U.S. patent application Ser. No. 11/088,831, entitled "System and Method for Inspecting Transportable Items Using Microwave Imaging," U.S. patent application Ser. No. 11/089,298, entitled "System and Method for Pattern Design in Microwave Programmable Arrays," U.S. patent application Ser. No. 11/088,610, entitled "System and Method for Microwave Imaging Using an Interleaved Pattern in a Programmable Reflector Amy," and U.S. patent application Ser. No. 11/088,830, entitled "System and Method for Minimizing Background Noise in a Microwave Image Using a Programmable Reflector Array" all of which were filed on even date herewith.

BACKGROUND OF THE INVENTION

Recent advances in microwave imaging have enabled commercial development of microwave imaging systems that are capable of generating two-dimensional and even three-dimensional microwave images of objects and other items of interest (e.g., human subjects). At present, there are several microwave imaging techniques available. For example, one technique uses an array of microwave detectors (hereinafter referred to as "antenna elements") to capture either passive microwave energy emitted by the target or reflected microwave energy reflected from the target in response to active microwave illumination of the target. A two-dimensional or three-dimensional image of a person or other item is constructed by scanning the array of antenna elements with respect to the target's position and/or adjusting the frequency (or wavelength) of the microwave energy being transmitted or detected.

Transmit and/or receive antenna arrays for use in transmitting and/or receiving microwave energy can be constructed using traditional analog phased arrays or binary reflector arrays, such as those described in U.S. pat. application Ser. No. 10/997,422, entitled "A Device for Reflecting Electromagnetic Radiation," and Ser. No. 10/997,583, entitled "Broadband Binary Phased Antenna." For either type of array, the largest addressable volume with the highest spatial resolution is obtained by choosing a small wavelength $\lambda$, densely filling the array with antenna elements such that the spacing between adjacent antenna elements in both directions is $\lambda/2$, and maximizing the two-dimensional area of the array. For example, if the array is a square of side L, an object located at a distance L from the array can be imaged with a resolution of approximately $\lambda$.

However, the number of antenna elements, and therefore the cost of the array, is proportional to $(L/\lambda)^2$. This quadratic cost dependency is an obstacle to either scaling up the size of an array to increase the addressable field of view or reducing the wavelength to increase the resolution. As used herein, the term "addressable field of view" (AFOV) refers to the volume addressable with high resolution (i.e., the volume that can be resolved within some specified factor of the highest resolution).

One solution that has been suggested for the cost-resolution-AFOV problem is to use a sparse antenna array, instead of a dense antenna array. Since resolution increases with numerical aperture, which depends on the diameter and not the area of the array, an array with two or four antenna elements spaced L apart can achieve the desired resolution. However, sparse arrays produce multi-lobed antenna patterns. If the array is a traditional transmit phased array and $1 \geq s \geq 0$ is the sparseness factor, Parseval's Theorem of Fourier analysis states that only s of the transmit power falls into an area that the originally dense (s=1) array of the same extent resolves. If the sparse array is a reflector array, and a transmit horn illuminates the full extent of the originally dense (s=1) array, the sparse array processes only s of the horn's power. Therefore, the efficiency factor (i.e., the transmitted fraction that fills the original area) is $s^2$. If the reflector array is used to both direct microwave illumination towards the target and receive reflected microwave illumination from the target, the overall efficiency factor $\eta = s^4$. For example, a 50% sparse reflector array produces a transmit-to-receive efficiency of $1/16 = 6.25\%$. Thus, as the sparseness of the array is increased, the signal loss increases as the fourth power.

The signal-to-noise (SNR) ratio of a sparse array also suffers the same $s^2$ or $s^4$ dependency. In addition, the background noise (often referred to as "clutter") that results from stray radiation further decreases the SNR for sparse arrays for several reasons. First, the vacant area of the originally dense (s=1) array becomes a collective plane mirror that specularly bounces the radiation with a fill factor efficiency of 1−s. Second, the remaining (occupancy) area geometry generally produces sidelobes that change direction in a poorly controlled fashion as the antenna phasing changes. The sidelobe weight increases as the sparseness of the array increases. To the degree that these two factors increase system noise as the array becomes sparser, SNR will vary empirically as $s^a/(1-s)^b$, where $a \approx 4$ and $b \approx 1$. Thus, sparse arrays result in an increase in signal loss and a decrease in SNR.

Therefore, what is needed is a cost-effective antenna array design for use in microwave imaging that results in a high AFOV without high power-law increases in signal loss or decreases in SNR.

SUMMARY OF THE INVENTION

Embodiments of the present invention provide a scanning panel for use in a microwave imaging system to capture a microwave image of a target. The scanning panel includes a plurality of antenna elements, each capable of being programmed with a respective phase delay to direct a transmit beam of microwave illumination toward the target, and each being capable of receiving reflected microwave illumination reflected from the target in a receive beam. The antenna elements are arranged in two complementary arrays. A first array of antenna elements is arranged to direct the transmit beam of microwave illumination in a transmit beam pattern towards the target. A second array of antenna elements is arranged to receive the receive beam in a receive beam pattern complementary to the transmit beam pattern. The microwave image of the target is formed at an intersection between the transmit beam and the receive beam.

In one embodiment, the antenna elements are reflecting antenna elements. A microwave source transmits microwave illumination towards the first array of antenna elements, which in turn reflects the microwave illumination based on the respective programmed phase delays to direct the beam of microwave illumination toward the target. The second array of antenna elements is configured to receive the reflected microwave illumination reflected from the target and reflect the reflected microwave illumination towards a microwave receiver based on an additional respective phase delay associated with the reflecting antenna elements in the second array.

In a further embodiment, the transmit beam pattern and the receive beam pattern are orthogonal elliptical beams, and the first and second arrays intersect near a midpoint of each of the arrays. In still a further embodiment, the transmit beam pattern is a coarse-spot single-lobed beam pattern, and the receive beam pattern is a fine-spot multi-lobed pattern. The first array has an area less than the area of the second array, and the first array has a density greater than the density of the second array. In another embodiment, the transmit beam pattern and the receive beam pattern are cross-shaped beams rotated 45 degrees with respect to each other.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 7 is a schematic diagram illustrating an exemplary illumination of a reflector array designed in accordance with the antenna array design of FIG. 6A;

FIG. 9 is a schematic diagram illustrating an exemplary illumination of an antenna array designed in accordance with the antenna array design of FIG. 8A;

DETAILED DESCRIPTION OF THE EXEMPLARY EMBODIMENTS

As used herein, the terms microwave radiation and microwave illumination each refer to the band of electromagnetic radiation having wavelengths between 0.3 mm and 30 cm, corresponding to frequencies of about 1 GHz to about 1,000 GHz. Thus, the terms microwave radiation and microwave illumination each include traditional microwave radiation, as well as what is commonly known as millimeter-wave radiation.

Figure 1:
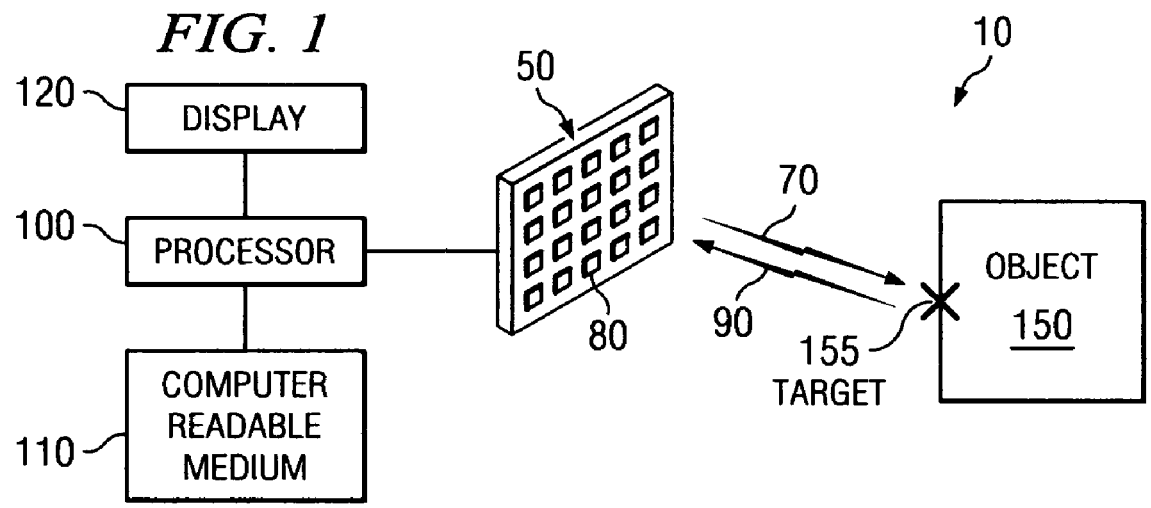
FIG. 1 is a schematic diagram of a simplified exemplary microwave imaging system using a scanning panel including an antenna array design in accordance with embodiments of the present invention.

FIG. 1 is a schematic diagram of a simplified exemplary microwave imaging system 10, in accordance with embodiments of the present invention. The microwave imaging system 10 includes a one or more scanning panels 50 (only one of which is shown for convenience), each capable of transmitting microwave radiation and/or receiving microwave radiation via antenna elements 80 to capture a microwave image of an object (e.g., suitcase, human subject or any other item of interest).

In one embodiment, the scanning panel 50 includes a passive programmable reflector array composed of reflecting antenna elements 80. Each of the reflecting antenna elements is capable of being programmed with a respective phase delay to direct microwave illumination towards a target 155 on the object 150 being imaged. The phase delay can be either binary or continuous. For example, microwave illumination received by the scanning panel 50 from a microwave source (not shown) is reflected towards the target 155 on the object 150, and reflected microwave illumination reflected from the target 155 and received by the scanning panel 50 is reflected towards microwave receiver (not shown) by programming each of the individual reflecting antenna elements 80 with a respective phase delay.

In another embodiment, the scanning panel 50 includes an active transmitter/receiver array composed of active antenna elements 80 capable of producing and transmitting microwave illumination and receiving and capturing reflected microwave illumination. For example, the active array may be in the form of a transmission array. In this embodiment, a remote microwave source is not used, as the scanning panel 50 operates as the source of microwave radiation. Each of the active antenna elements in the active transmitter/receiver array is individually programmable with a respective phase shift to steer a beam of microwave illumination towards the target 155.

The microwave imaging system 10 further includes a processor 100, computer-readable medium 110 and a display 120. The processor 100 includes any hardware, software, firmware, or combination thereof for controlling the scanning panel 50 and processing the received microwave illumination reflected from the target 155 to construct a microwave image of the target 155 and/or object 150. For example, the processor 100 may include one or more microprocessors, microcontrollers, programmable logic devices, digital signal processors or other type of processing devices that are configured to execute instructions of a computer program, and one or more memories (e.g., cache memory) that store the instructions and other data used by the processor 100. However, it should be understood that other embodiments of the processor 100 may be used. The memory 110 is any type of data storage device, including but not limited to, a hard drive, random access memory (RAM), read only memory (ROM), compact disc, floppy disc, ZIP® drive, tape drive, database or other type of storage device or storage medium.

The processor 100 operates to program the phase delays or phase shifts of each of the individual antenna elements 80 in the scanning panel 50 to illuminate multiple targets 155 on the object 150 with microwave radiation and/or receive reflected microwave illumination from multiple targets 155 on the object 150. Thus, the processor 100 in conjunction with the scanning panel 50 operates to scan the object 150.

The processor 100 is further capable of constructing a microwave image of the object 150 using the intensity of the reflected microwave illumination captured by the scanning panel 50 from each target 155 on the object 150. For example, if the scanning panel 50 is a reflector array, the microwave receiver (not shown) is capable of combining the reflected microwave illumination reflected from each antenna element 80 in the scanning panel 50 to produce a value of the effective intensity of the reflected microwave illumination at the target 155. The intensity value is passed to the processor 100, which uses the intensity value as the value of a pixel or voxel corresponding to the target 155 on the object 150. In operation, the microwave imaging system 10 can operate at frequencies that enable millions of targets 155 to be scanned per second.

The resulting microwave image of the target 155 and/or object 150 can be passed from the processor 100 to the display 120 to display the microwave image. In one embodiment, the display 120 is a two-dimensional display for displaying a three-dimensional microwave image of the object 30 or one or more one-dimensional or two-dimensional microwave images of the target 155 and/or object 150. In another embodiment, the display 120 is a three-dimensional display capable of displaying a three-dimensional microwave image of the object 150.

It should be understood that multiple scanning panels 50 may be used to scan different portions of the object 150. For example, the microwave imaging system 10 can be implemented with two scanning panels, each including a 1 m×1 m array of antenna elements 80 to scan half of the object 150. As another example, the microwave imaging system 10 can be implemented with four scanning panels 50, each including a 0.5 m×0.5 m array of antenna elements 80 capable of scanning a quadrant of the object 150.

Figure 2:
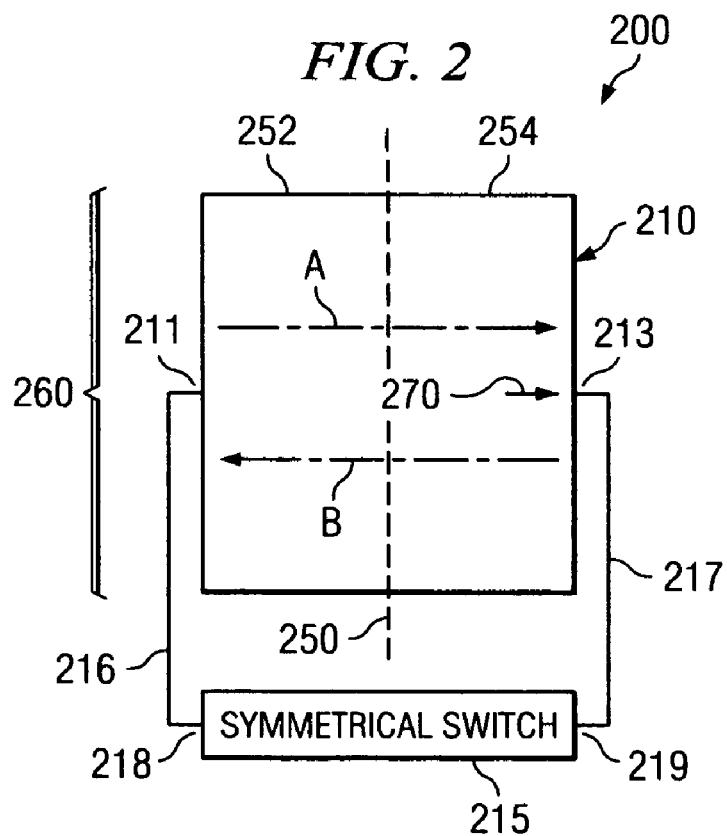
FIG. 2 illustrates an exemplary active antenna element for use in an active transmit/receive array, in accordance with embodiments of the present invention.

FIG. 2 illustrates an example of an active antenna element 200 (corresponding to an antenna element 80 in FIG. 1) for use in an active transmit/receive array. The active antenna element 200 is a broadband binary phased antenna element including an antenna 210 connected to a respective switch 215. The switch 215 can be, for example, a single-pole double-throw (SPDT) switch or a double-pole double-throw (DPDT) switch. The operating state of the switch 215 controls the phase of the respective antenna element 200. For example, in a first operating state of the switch 215, the antenna element 200 may be in a first binary state (e.g., 0 degrees), while in a second operating state of the switch 215, the antenna element 200 may be in a second binary state (e.g., 180 degrees). The operating state of the switch 215 defines the terminal connections of the switch 215. For example, in the first operating state, terminal 218 may be in a closed (short circuit) position to connect feed line 216 between the antenna 210 and the switch 215, while terminal 219 may be in an open position. The operating state of each switch 215 is independently controlled by a control circuit (not shown) to individually set the phase of each antenna element 200.

As used herein, the term symmetric antenna 210 refers to an antenna that can be tapped or fed at either of two feed points 211 or 213 to create one of two opposite symmetric field distributions or electric currents. As shown in FIG. 2, the two opposite symmetric field distributions are created by using a symmetric antenna 210 that is symmetric in shape about a mirror axis 250 thereof. The mirror axis 250 passes through the antenna 210 to create two symmetrical sides 252 and 254. The feed points 211 and 213 are located on either side 252 and 254 of the mirror axis 250 of the antenna 210. In one embodiment, the feed points 211 and 213 are positioned on the antenna 210 substantially symmetrical about the mirror axis 250. For example, the mirror axis 250 can run parallel to one dimension 260 (e.g., length, width, height, etc.) of the antenna 210, and the feed points 211 and 213 can be positioned near a midpoint 270 of the dimension 260. In FIG. 2, the feed points 211 and 213 are shown positioned near a midpoint 270 of the antenna 210 on each side 252 and 254 of the mirror axis 250.

The symmetric antenna 210 is capable of producing two opposite symmetric field distributions, labeled A and B. The magnitude (e.g., power) of field distribution A is substantially identical to the magnitude of field distribution B, but the phase of field distribution A differs from the phase of field distribution B by 180 degrees. Thus, field distribution A resembles field distribution B at ±180° in the electrical cycle.

The symmetric antenna 210 is connected to the symmetric switch 215 via feed lines 216 and 217. Feed point 211 is connected to terminal 218 of the symmetric switch 215 via feed line 216, and feed point 213 is connected to terminal 219 of the symmetric switch 215 via feed line 217. As used herein, the term symmetric switch refers to either a SPDT or DPDT switch in which the two operating states of the switch are symmetric about the terminals 218 and 219.

For example, if in a first operating state of a SPDT switch, the impedance of channel α is 10 Ω and the impedance of channel β is 1 kΩ, then in the second operating state of the SPDT switch, the impedance of channel α is 1 kΩ and the impedance of channel β is 10 Ω. It should be understood that the channel impedances are not required to be perfect opens or shorts or even real. In addition, there may be crosstalk between the channels, as long as the crosstalk is state-symmetric. In general, a switch is symmetric if the S-parameter matrix of the switch is identical in the two operating states of the switch (e.g., between the two terminals 218 and 219).

Figure 3:
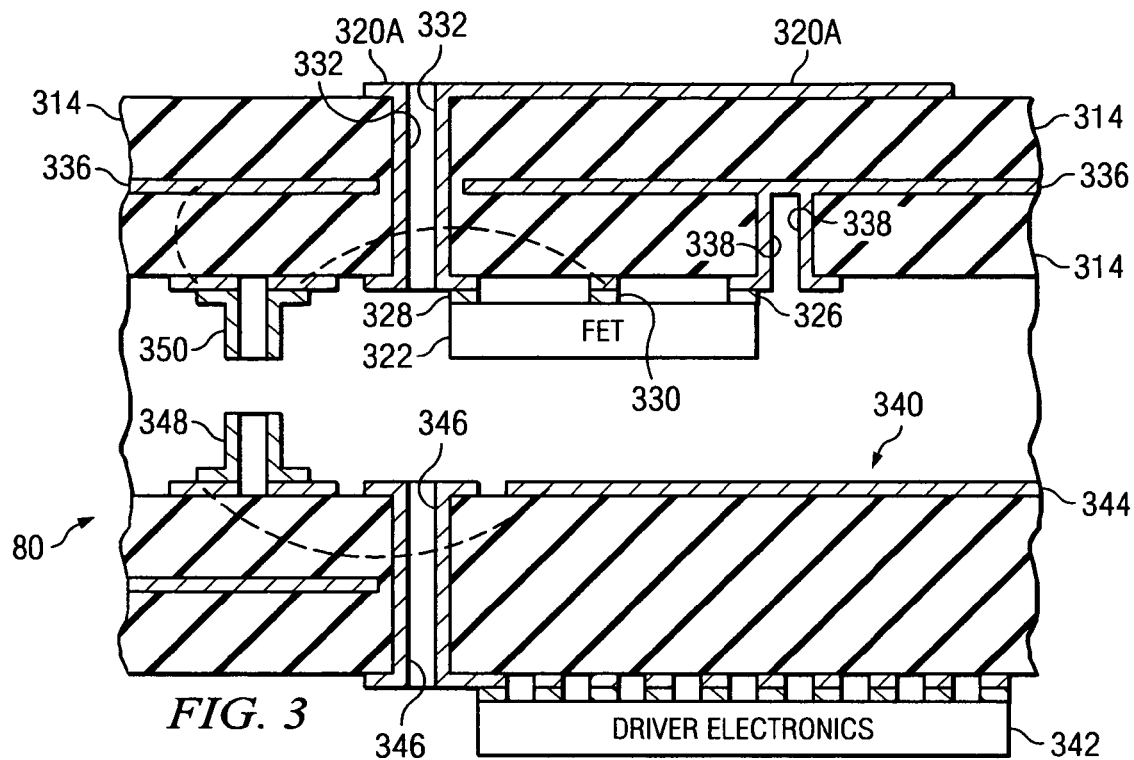
FIG. 3 is a cross-sectional view of a passive antenna element for use in a reflector array, in accordance with embodiments of the present invention.

FIG. 3 illustrates a cross-sectional view of a reflecting antenna element 300 (corresponding to antenna element 80 in FIG. 1) that operates to reflect electromagnetic radiation with varying phase depending on the impedance state of the antenna element 300. The reflecting antenna element 300 includes an antenna (patch antenna 320a) and a non-ideal switching device (surface mounted field effect transistor "FET" 322).

The reflecting antenna element 300 is formed on and in a printed circuit board substrate 314 and includes the surface mounted FET 322, the patch antenna 320a, a drain via 332, a ground plane 336 and a source via 338. The surface mounted FET 322 is mounted on the opposite side of the printed circuit board substrate 314 as the planar patch antenna 320a and the ground plane 336 is located between the planar patch antenna 320a and the surface mounted FET 322. The drain via 332 connects the drain 328 of the surface mounted FET 322 to the planar patch antenna 320a and the source via 338 connects the source 326 of the surface mounted FET 322 to the ground plane 336.

In a working product, the reflector antenna array is connected to a controller board 340 that includes driver electronics. An example controller board 340 is also depicted in FIG. 3 and includes a ground plane 344, a drive signal via 346, and driver electronics 342. The controller board 340 also includes connectors 348 that are compatible with connectors 350 of the reflector antenna array. The connectors 348 of the two boards can be connected to each other, for example, using wave soldering. It should be understood that in other embodiments, the FET 322 can be surface mounted on the same side of the printed circuit board substrate 314 as the planar patch antenna 320a. Additionally, the driver electronics 342 can be soldered directly to the same printed circuit board in which the reflecting antenna element 300 is built.

The patch antenna element 320a functions to reflect with more or less phase shift depending on the impedance level of the reflecting antenna element 300. The reflecting antenna element 300 has an impedance characteristic that is a function of the antenna design parameters. Design parameters of antennas include but are not limited to, physical attributes such as the dielectric material of construction, the thickness of the dielectric material, shape of the antenna, length and width of the antenna, feed location, and thickness of the antenna metal layer.

The FET 330 (non-ideal switching device) changes the impedance state of the reflecting antenna element 300 by changing its resistive state. A low resistive state (e.g., a closed or "short" circuit) translates to a low impedance. Conversely, a high resistive state (e.g., an open circuit) translates to a high impedance. A switching device with ideal performance characteristics (referred to herein as an "ideal" switching device) produces effectively zero impedance ($Z=0$) when its resistance is at its lowest state and effectively infinite impedance ($Z=\infty$) when its resistance is at its highest state. As described herein, a switching device is "on" when its impedance is at its lowest state (e.g., $Z_{on}=0$) and "off" when its impedance is at its highest state (e.g., $Z_{off}=\infty$). Because the on and off impedance states of an ideal switching device are effectively $Z_{on}=0$ and $Z_{off}=\infty$, an ideal switching device is able to provide the maximum phase shift without absorption of electromagnetic radiation between the on and off states. That is, the ideal switching device is able to provide switching between 0 and 180 degree phase states. In the case of an ideal switching device, maximum phase-amplitude performance can be achieved with an antenna that exhibits any finite non-zero impedance.

In contrast to an ideal switching device, a "non-ideal" switching device is a switching device that does not exhibit on and off impedance states of $Z_{on}=0$ and $Z_{off}=\infty$), respectively. Rather, the on and off impedance states of a non-ideal switching device are typically, for example, somewhere between $0<|Z_{on}|<|Z_{off}|<\infty$. However, in some applications, the on and off impedance states may even be $|Z_{off}|<=|Z_{on}|$. A non-ideal switching device may exhibit ideal impedance characteristics within certain frequency ranges (e.g., <10 GHz) and highly non-ideal impedance characteristics at other frequency ranges (e.g., >20 GHz).

Because the on and off impedance states of a non-ideal switching device are somewhere between $Z_{on}=0$ and $Z_{off}=\infty$, the non-ideal switching device does not necessarily provide the maximum phase state performance regardless of the impedance of the corresponding antenna, where maximum phase state performance involves switching between 0 and 180 degree phase states. In accordance with the invention, the reflecting antenna element 300 of FIG. 3 is specifically designed to provide optimal phase performance, where the optimal phase state performance of a reflecting antenna element is the point at which the reflecting element is closest to switching between 0 and 180 degree phase-amplitude states. In an embodiment, to achieve optimal phase state performance, the antenna element 300 is configured as a function of the impedance of the non-ideal switching device (FET 330). For example, the antenna element 300 is designed such that the impedance of the antenna element 300 is a function of impedance characteristics of the FET 330.

Further, the antenna element 300 is configured as a function of the impedance of the non-ideal switching device (FET 330) in the on state, $Z_{on}$, and the impedance of the non-ideal switching device 330 in the off state, $Z_{off}$. In a particular embodiment, the phase state performance of the reflecting antenna element 300 is optimized when the antenna element 300 is configured such that the impedance of the antenna element 300 is conjugate to the square root of the impedance of the non-ideal switching device 330 when in the on and off impedance states, $Z_{on}$ and $Z_{off}$. Specifically, the impedance of the antenna element 300 is the complex conjugate of the geometric mean of the on and off impedance states, $Z_{on}$ and $Z_{off}$, of the corresponding non-ideal switching device 330. This relationship is represented as:

$$Z_{antenna}* = \sqrt{Z_{on}Z_{off}} \qquad (1)$$

The above-described relationship is derived using the well-known formula for the complex reflection coefficient between a source impedance and a load impedance. Choosing the source to be the antenna element 300 and the load to be the non-ideal switching device 330, the on-state reflection coefficient is set to be equal to the opposite of the off-state reflection coefficient to arrive at equation (1).

Designing the antenna element 300 to exhibit optimal phase-amplitude performance involves determining the on and off impedances, $Z_{on}$ and $Z_{off}$ of the particular non-ideal switching device that is used in the reflecting antenna element 300 (in this case, FET 330). Design parameters of the antenna element 300 are then manipulated to produce an antenna element 300 with an impedance that matches the relationship expressed in equation (1) above. An antenna element 300 that satisfies equation (1) can be designed as long as $Z_{on}$ and $Z_{off}$ are determined to be distinct values.

Another type of switching device, other than the surface mounted FET 330 shown in FIG. 3, that exhibits non-ideal impedance characteristics over the frequency band of interest is a surface mount diode. However, although surface mounted diodes exhibit improved impedance characteristics over the frequency band of interest compared to surface mounted FETs, surface mounted FETs are relatively inexpensive and can be individually packaged for use in reflector antenna array applications.

In a reflector antenna array that utilizes FETs as the non-ideal switching devices, the beam-scanning speed that can be achieved depends on a number of factors including signal-to-noise ratio, crosstalk, and switching time. In the case of a FET, the switching time depends on gate capacitance, drain-source capacitance, and channel resistance (i.e., drain-source resistance). The channel resistance is actually space-dependent as well as time-dependent. In order to minimize the switching time between impedance states, the drain of the FET is preferably DC-shorted at all times. The drain is preferably DC-shorted at all times because floating the drain presents a large off-state channel resistance as well as a large drain-source capacitance due to the huge parallel-plate area of the patch antenna. This implies that the antenna is preferably DC-shorted but one wishes the only "rf short" the antenna sees be at the source. Therefore, the additional antenna/drain short must be optimally located so as to minimally perturb the antenna.

It should be understood that other types of antennas can be used in the reflecting antenna element 300, instead of the patch antenna 320a. By way of example, but not limitation, other antenna types include dipole, monopole, loop, and dielectric resonator type antennas. In addition, in other embodiments, the reflecting antenna element 300 can be a continuous phase-shifted antenna element 300 by replacing the FETs 330 with variable capacitors (e.g., Barium Strontium Titanate (BST) capacitors). With the variable capacitor loaded patches, continuous phase shifting can be achieved for each antenna element 300, instead of the binary phase shifting produced by the FET loaded patches. Continuous phased arrays can be adjusted to provide any desired phase shift in order to steer a microwave beam towards any direction in a beam scanning pattern.

Figure 4:
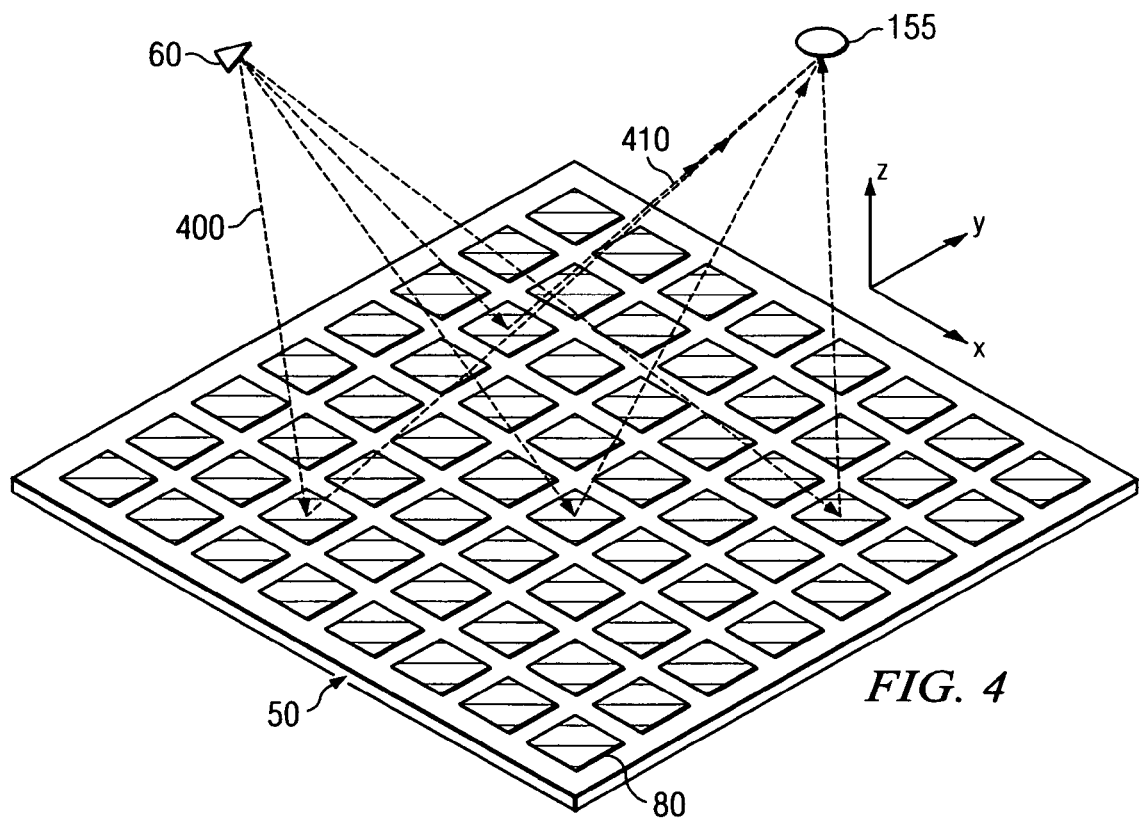
FIG. 4 is a schematic diagram of a top view of an exemplary scanning panel incorporating a reflector array for reflecting microwave illumination, in accordance with embodiments of the present invention.

FIG. 4 is a schematic diagram of a top view of an exemplary scanning panel 50 for reflecting microwave illumination, in accordance with embodiments of the present invention. In FIG. 4, microwave illumination 400 transmitted from a microwave source (antenna) 60 is received by various antenna elements 80 in the scanning panel 50. The antenna elements 80 are each programmed with a respective phase delay to direct reflected microwave illumination 410 towards a target 155. The phase delays are selected to create positive interference of the reflected microwave illumination 410 from each of the antenna elements 80 at the target 155. Ideally, the phase shift of each of the antenna elements 80 is adjusted to provide the same phase delay for each path of the reflected microwave illumination 410 from the source (antenna element 80) to the target 155.

Although not shown, it should be understood that in a similar manner, microwave illumination reflected from the target 155 and received at the scanning panel 50 can be reflected towards a microwave receiver (not shown). The microwave source 60 can be positioned either in the same spatial location as the microwave receiver as a separate antenna or as part of the microwave receiver, and illuminate the target 155 through the scanning panel 50, or can be positioned at a different spatial location from the microwave receiver and either illuminate the target 155 directly or through one of the scanning panels 50 (e.g., the same scanning panel 50 as the microwave receiver or a different scanning panel 50).

To reduce the cost of producing a scanning panel 50 including active or reflective antenna elements 80, while maintaining the addressable field of view (AFOV), the number of antenna elements 80 in the scanning panel 50 can be reduced by providing complementary transmit and receive antenna arrays in the scanning panel 50, in accordance with embodiments of the present invention. The complementary transmit and receive antenna arrays generate complementary transmit and receive microwave beam patterns, respectively. The microwave image of the target is formed at the intersection of the complementary transmit and receive microwave beam patterns. Thus, deficiencies in the transmit beam can be compensated by the receive beam, and vice-versa. The complementary transmit and receive arrays are each composed of a vastly reduced number of antenna elements, such that the total antenna elements in the scanning panel 50 is significantly reduced, as compared to the originally dense array shown in FIG. 4. This reduction in element count directly translates into reduced cost.

Figure 5A:
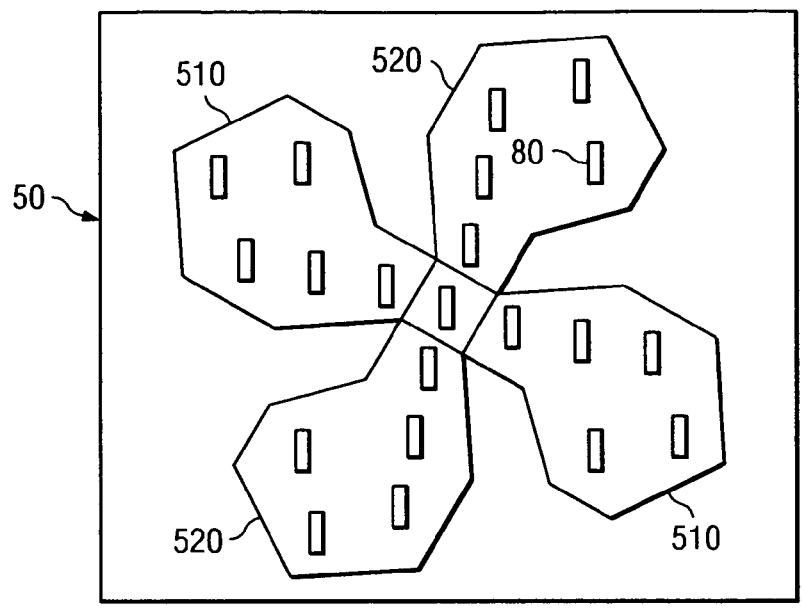
FIG. 5A is a schematic diagram of an exemplary antenna array design, in accordance with embodiments of the present invention.
Figure 5B:
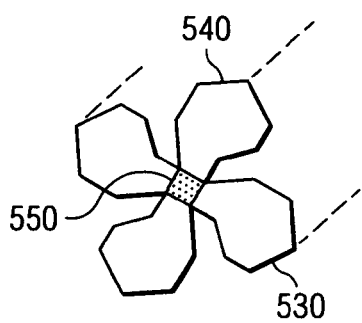
FIG. 5B is a pictorial representation of the microwave beam radiation pattern produced by the antenna array design shown in FIG. 5A.

Referring now to FIGS. 5A and 5B, FIG. 5A is a schematic diagram of one exemplary complementary antenna array design, and FIG. 5B is a pictorial representation of the microwave beam radiation pattern produced by the antenna array design shown in FIG. 5A, in accordance with embodiments of the present invention. The scanning panel 50 in FIG. 5A is shown including antenna elements 80 arranged in a transmit array 510 and a receive array 520. The antenna elements 80 in the transmit array 510 and the receive array 520 are arranged in respective patterns. The pattern of antenna elements 80 in the transmit array 510 is complementary to the pattern of antenna elements 80 in the receive array 520.

Each of the antenna elements 80 in the transmit array 510 is programmed with a respective phase delay to direct a transmit beam 530 of microwave illumination in a transmit beam pattern corresponding to the pattern of the antenna elements 80 in the transmit array 510. Each of the antenna elements 80 in the receive array 510 is programmed with a respective phase delay to receive a receive beam 540 of reflected microwave illumination in a receive beam pattern corresponding to the pattern of the antenna elements 80 in the receive array 520. The receive beam pattern is complementary to the transmit beam pattern as a result of the complementary transmit and receive arrays 510 and 520, respectively. A microwave image can be formed at an intersection 550 of the complementary transmit and receive microwave beams 530 and 540, respectively. More specifically, the image signal produced is the volume-integrated cross product of the transmit and receive microwave beams 530 and 540. Such transmit/receive "cross hairs" enable resolution of small-radius features.

As opposed to dense arrays (such as the one shown in FIG. 4) where the cost of the array is proportional to the footprint area (A) of the dense array, the cost of the complementary reduced-element count arrays 510 and 520 shown in FIG. 5A is proportional to only the square root of A, which achieves a significant cost savings. In addition, AFOV is unchanged between the dense array of FIG. 4 and the complementary reduced-element count arrays 510 and 520 of FIG. 5A because the overall extent of the complementary arrays and the minimum pitch is the same as for the originally dense array. However, approximating the beams as Gaussian beams, there is a reduction in resolution in the design of FIG. 5A as compared with the dense array design in FIG. 4 by a small factor, depending on the details of the beam patterns of both the originally dense array and the reduced-element count arrays, generally falling in the range of 1-1.7. Furthermore, although SNR is reduced by a factor of $s^2$ for reflector arrays designed with complementary reduced-element count arrays 510 and 520, the SNR is still significantly lower than the $s^4$ dependence in the case of arbitrary sparse arrays with nonselective illumination.

Figure 6A:
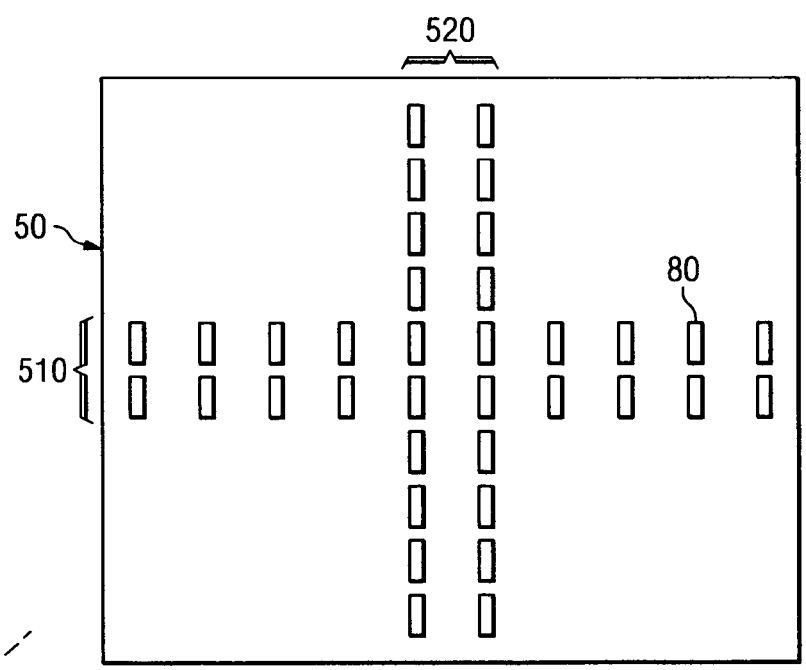
FIG. 6A is a schematic diagram of another exemplary antenna array design, in accordance with embodiments of the present invention.
Figure 6B:
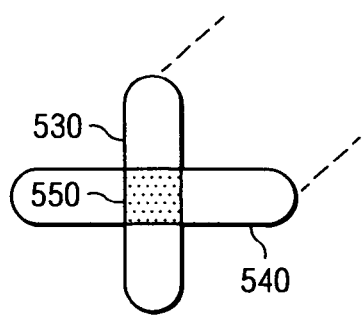
FIG. 6B is a pictorial representation of the microwave beam radiation pattern produced by the antenna array design shown in FIG. 6A.

Referring now to FIGS. 6A and 6B, there is illustrated another exemplary design for a complementary reduced-element count array. FIG. 6A is a schematic diagram of the exemplary antenna array design, while FIG. 6B is a pictorial representation of the microwave beam radiation pattern produced by the antenna array design shown in FIG. 6A in accordance with embodiments of the present invention. The scanning panel 50 in FIG. 6A is shown including antenna elements 80 arranged in orthogonal transmit and receive arrays 510 and 520, respectively.

The pattern of antenna elements 80 in the transmit array 510 is orthogonal to the pattern of antenna elements 80 in the receive array 520. In addition, the transmit array 510 intersects the receive array 520 near a midpoint of both the transmit and receive arrays 510 and 520, respectively. In FIG. 6A, the transmit array 510 includes two rows of antenna elements, while the receive array 520 includes two columns of antenna elements. However, in general, the design shown in FIG. 6A can be represented as a rectangular m*M transmit array 510 pattern, where M>>m, and a rectangular N*n receive array 520 pattern, where N>>n. For example, if a tile is defined as consisting of n*m antenna elements, a dense square array of N*M antenna elements is composed of (N/m)*(M/n) tiles. In an array designed in accordance with FIG. 6A, there are only N+M−1 tiles, including an intersecting tile that is shared between the transmit and receive arrays 510 and 520, respectively.

The transmit array 510 produces a transmit beam 530 in a vertical elliptical beam pattern, whereas the receive array 520 produces a receive beam 540 in a horizontal elliptical beam pattern. It should be understood that as used herein, "horizontal (vertical) elliptical pattern" means that focal spot of the beam is an ellipse, and the long axis of the ellipse is horizontal (vertical). A microwave image can be formed at an intersection 550 of the complementary transmit and receive microwave beams 530 and 540, respectively.

If the transmit and receive arrays 510 and 520, respectively, shown in FIG. 6A are active transmit/receive arrays (i.e., the feed networks are wired networks built into the arrays), the SNR empirically should scale as $\sim s^a/(1-s)^b$, where $1 \geq s \geq 0$ is the sparseness factor, $a \approx 2$ and $b \approx 0$. The smaller exponents than that discussed above for a traditional sparse array stem from the fact that there is no wasted radiation illuminating vacant areas. Therefore, a sparser antenna set can be used when designed in accordance with embodiments of the present invention, such as the design shown in FIG. 6A.

If the transmit and receive arrays 510 and 520, respectively, are reflector arrays, the arrays 510 and 520 must be fed wirelessly with microwave sources and microwave receivers designed to transmit and receive microwave beams to and from the arrays 510 and 520. FIG. 7 is a schematic diagram illustrating an exemplary illumination of a reflector array designed in accordance with the antenna array design of FIG. 6A. In FIG. 7, custom horns 60a and 60b are shown for feeding the reflector arrays 510 and 520 with elliptical microwave illumination beams or "fan beams" 70 and 90, respectively. Each custom horn 60a and 60b has a high aspect ratio radiating aperture and a lens insert (not shown) at the radiating aperture to provide for correct phase fronts.

In FIG. 7, the microwave source 60a is a horn with a narrow but tall aperture, while the microwave receiver 60b is a horn with a wide but short aperture. It should be understood that other types of custom horn feeds are possible, instead of the particular horn feeds shown in FIG. 7. For example, leaky waveguides, cylindrical lenses, cylindrical mirrors and other types of custom horns may be used with embodiments of the present invention. Regardless of the type of custom horn, the antenna pattern of the custom horn feed radiator should have a high aspect ratio between its beamwidths in the two principal planes of its main lobe (i.e., the feed generates an elliptical of fan-shaped beam that is nearly optimal for illuminating the transmit array 510 or receive array 520). In addition, the microwave source 60a and microwave receiver 60b should be distinct, non-collocated radiators due to the complementary aspect ratio of the horns 60a and 60b.

However, it should be understood that in other embodiments, the microwave source 60a and microwave receiver 60b may be collocated radiators. In addition, it should be understood that in other embodiments, the transmit and receive arrays 510 and 520, respectively, may be transmission arrays, in which the horns 60a and 60b are located behind the scanning panel 50 to illuminate the transmit and receive arrays 510 and 520, respectively, from behind (i.e., the arrays 510 and 520 are situated between the target and the horns 60a and 60b). Furthermore, it should be understood that in other embodiments, hybrid designs are possible where one of the arrays 510 or 520 is a reflector array illuminated in front and the other array 510 or 520 is a transmission array illuminated from behind.

Figure 8A:
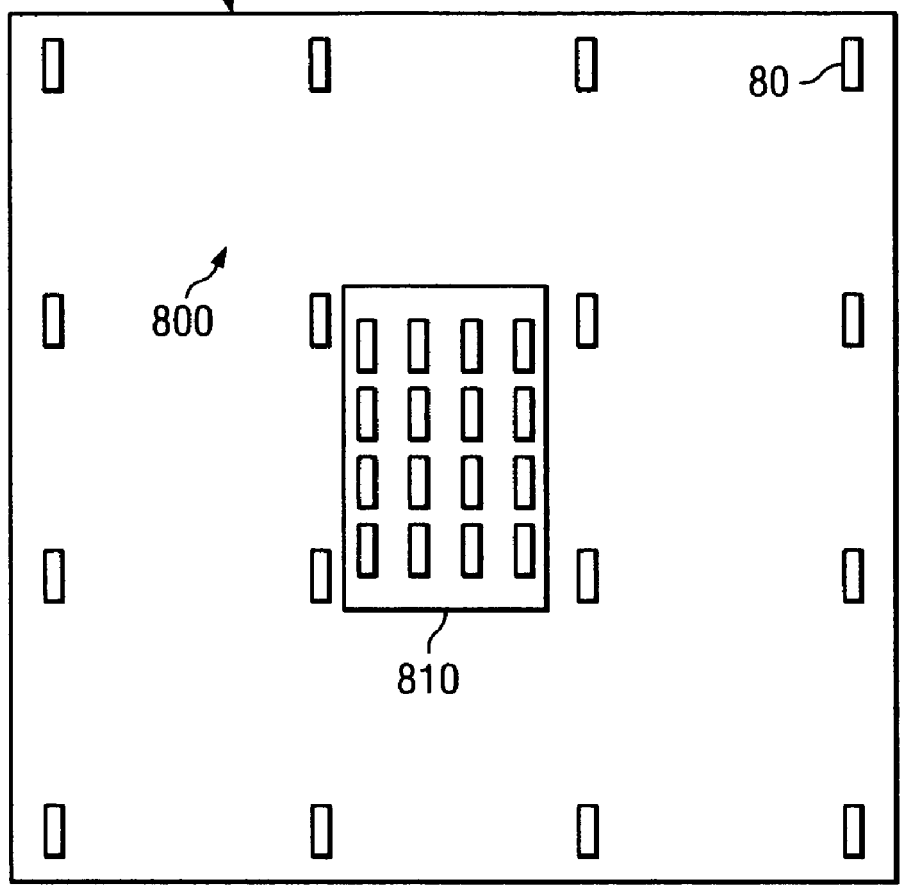
FIG. 8A is a schematic diagram of another exemplary antenna array design, in accordance with embodiments of the present invention.
Figure 8B:
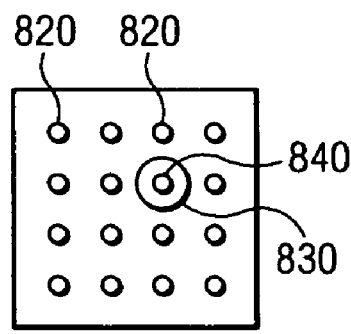
FIG. 8B is a pictorial representation of the microwave beam radiation pattern produced by the antenna array design shown FIG. 8A.

Referring now to FIGS. 8A and 8B, there is illustrated another exemplary design for a complementary reduced-element count array. FIG. 8A is a schematic diagram of the exemplary antenna array design, while FIG. 8B is a pictorial representation of the microwave beam radiation pattern produced by the antenna array design shown in FIG. 8A in accordance with embodiments of the present invention. The scanning panel 50 in FIG. 8A is shown including antenna elements 80 arranged in a sparse, large-area array 800 and a dense, small-area array 810. Either array 800 or 810 can correspond to the transmit or receive arrays 510 and 520, respectively of FIGS. 5A and 6A.

The sparse, large-area array 800 produces a beam 820 in a fine-spot, multi-lobed beam pattern, whereas the dense, small-area array 810 produces a beam 830 in a coarse-spot, single-lobed pattern. The sparse, large-area array 800 provides high numerical aperture, and hence small focal spot size. However, the beam 820 produced by the sparse, large-area array 800 suffers from a high sidelobe count due to the sparseness of the array 800. Therefore, the sparse, large-area array 800 by itself cannot provide unambiguous targeting. Forming the microwave image at an intersection 840 with the coarse, but single-lobed beam 830 removes the ambiguity. It should be understood that although it may appear as though each spot shown in FIG. 8B in the fine pattern is in a 1:1 correspondence with the antenna elements 80 in the sparse, large area array 800, each spot is actually formed from the collective contribution of all of the antenna elements 80 in the sparse, large-area array.

If the arrays 800 and 810, respectively, are reflector arrays, the arrays 800 and 810 must be fed wirelessly with microwave sources and microwave receivers designed to transmit and receive microwave beams to and from the arrays 800 and 810. FIG. 9 is a schematic diagram illustrating an exemplary illumination of an antenna array designed in accordance with the antenna array design of FIG. 8A. In FIG. 9, custom horns 60a and 60b are shown for feeding the reflector arrays 800 and 810 with appropriate microwave illumination beams 910 and 920, respectively.

The horn 60a for feeding the dense, small-area array 810 is a standard, relatively high-directivity horn. However, the horn 60b for feeding the sparse, large-area array 800 includes a custom diffractive optical element (DOE) designed to selectively illuminate only the antenna elements 80 in the sparse, large-area array 800. For example, in one embodiment, the DOE is a transparent plate with a fixed set of dimples or etchings, and the horn 60b is a standard horn.

It should be understood that in other embodiments, one or more of the arrays 800 and 810 may be a transmission array that is illuminated from behind. For example, one or more of the arrays 800 and 810 may be situated between the target and the horns 60*a* and 60*b*).

Figure 10:
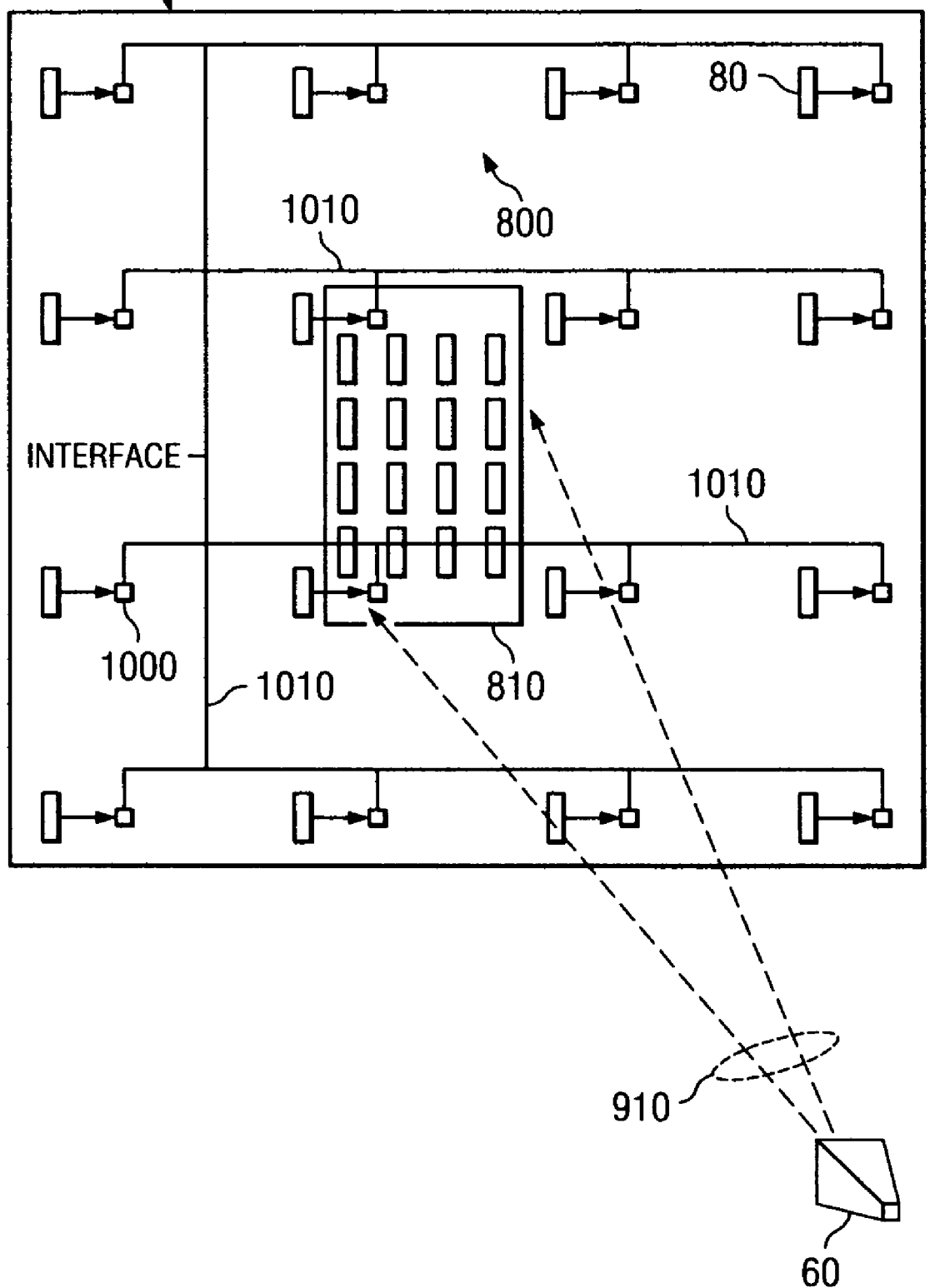
FIG. 10 is a schematic diagram illustrating another exemplary illumination of an antenna array designed in accordance with the antenna array design of FIG. 8A.

FIG. 10 is a schematic diagram illustrating another exemplary illumination of an antenna array designed in accordance with the antenna array design of FIG. 8A. In FIG. 10, the dense, small-area array 810 is horn-fed, but the sparse, large-area array 800 is fed through a wired network 1010. Each antenna element 80 in the sparse, large-area array 800 is connected to a respective frequency converter 1000, and the wired network 1010 provides a feed signal at a lower, intermediate frequency (IF) (e.g., 10-100 MHz). Phase-shifting of the sparse, large-area antenna elements 80 can be performed at either the radio frequency (RF) or the IF, depending on the cost of the up-converter/down-converter.

Figure 11A:
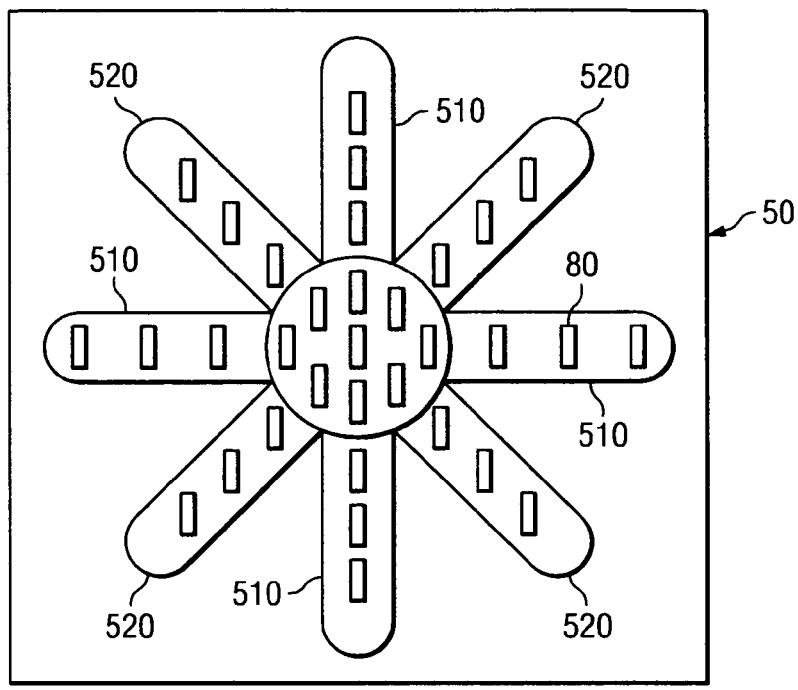
FIG. 11A is a schematic diagram of another exemplary antenna array design, in accordance with embodiments of the present invention.
Figure 11B:
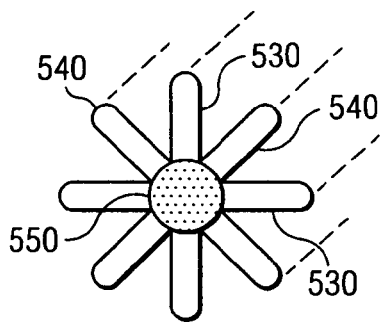
FIG. 11B is the microwave beam radiation pattern produced by the antenna array design shown in FIG. 11A.

Referring now to FIGS. 11A and 11B, there is illustrated another exemplary design for a complementary reduced-element count array. FIG. 11A is a schematic diagram of the exemplary antenna array design, while FIG. 11B is a pictorial representation of the microwave beam radiation pattern produced by the antenna array design shown in FIG. 11A in accordance with embodiments of the present invention. The scanning panel 50 in FIG. 11A is shown including antenna elements 80 arranged in transmit and receive cross-shaped arrays 510 and 520, respectively.

The cross-shaped pattern of antenna elements 80 in the transmit array 510 is rotated 45 degrees with respect to the cross-shaped pattern of antenna elements 80 in the receive array 520. In addition, the transmit array 510 intersects the receive array 520 near a midpoint of both the transmit and receive arrays 510 and 520, respectively. The transmit array 510 produces a transmit beam 530 in a cross-shaped beam pattern, whereas the receive array 520 produces a receive beam 540 in a cross-shaped beam pattern that is rotated 45 degrees from the transmit beam 530. A microwave image can be formed at an intersection 550 of the complementary transmit and receive microwave beams 530 and 540, respectively.

If the transmit and receive arrays 510 and 520, respectively, are reflector arrays, the arrays 510 and 520 must be fed wirelessly with microwave sources and microwave receivers designed to transmit and receive microwave beams to and from the arrays 510 and 520. For example, the arrays 510 and 520 could be fed using horns whose output radiating apertures are a cross and a cross rotated 45 degrees. In comparison to FIG. 6A, although the design in FIG. 11A provides a higher resolution for the same footprint area of the arrays, the design in FIG. 11A includes more antenna elements (about twice as many) than the design in FIG. 6A, and therefore, is more costly to produce.

It should be understood that the antenna transmit/receive array designs described herein are only illustrative of the many types of complementary array patterns that are possible in accordance with embodiments of the present invention. By way of example, but not limitation, other designs include k-armed stars and rotated k-armed stars and k-sided polygons and rotated k-sided polygons, where k is some positive integer.

Figure 12:
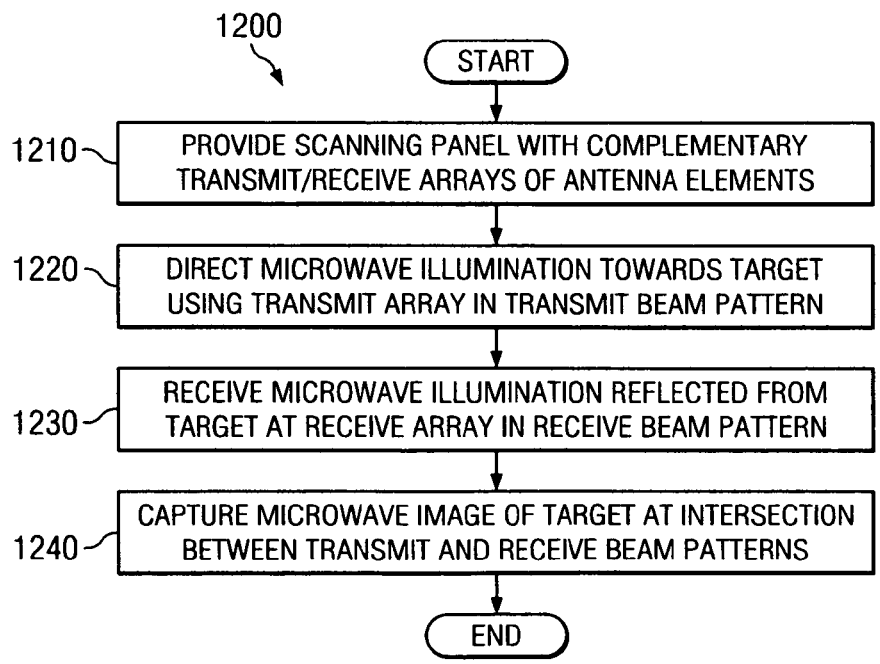
FIG. 12 is a flow chart illustrating an exemplary process for capturing a microwave image of a target, in accordance with embodiments of the present invention.

FIG. 12 is a flow chart illustrating an exemplary process 1200 for capturing a microwave image of a target, in accordance with embodiments of the present invention. Initially, a scanning panel including complementary transmit and receive arrays of antenna elements is provided at block 1210. At block 1220, each of the antenna elements in the transmit array is programmed with a respective phase delay to direct a beam of microwave illumination towards a target in a transmit beam pattern. At block 1230, each of the antenna elements in the receive array is programmed with a respective phase delay to receive a receive beam microwave illumination reflected from the target in a receive beam pattern, complementary to the transmit beam pattern. At block 1240, a microwave image of the target is captured at an intersection between the transmit and receive beams.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A scanning panel for use in a microwave imaging system to capture a microwave image of a target, comprising:
   a plurality of antenna elements, each capable of being programmable with a respective phase delay to direct a transmit beam of microwave illumination toward the target, and each being capable of receiving reflected microwave illumination reflected from the target in a receive beam, said plurality of antenna elements including:
   a first array of antenna elements arranged to direct the transmit beam of microwave illumination in a transmit beam pattern, and
   a second array of antenna elements arranged to receive the receive beam in a receive beam pattern complementary to said transmit beam pattern;
   wherein the microwave image of the target is formed at an intersection of said transmit beam and said receive beam, and wherein said intersection is the volume-integrated cross-product of said transmit beam and said receive beam.

2. The scanning panel of claim 1, wherein each of said plurality of antenna elements is a reflecting antenna element.

3. The scanning panel of claim 2, wherein each said reflecting antenna element in said first array is configured to receive microwave illumination from a microwave source and reflect the microwave illumination based on the respective programmed phase delays to direct the transmit beam of microwave illumination toward the target.

4. The scanning panel of claim 3, wherein each said reflecting antenna element in said second array is configured to receive the receive beam and reflect the receive beam towards a microwave receiver based on an additional respective phase delay associated with said reflecting antenna elements in said second array.

5. The scanning panel of claim 1, wherein each of said plurality of antenna elements are binary phase-shifted antenna elements, continuous phase-shifted antenna elements or variable capacitor loaded patch antenna elements.

6. The scanning panel of claim 5, wherein each of said binary phase-shifted antenna elements includes a non-ideal switching device in electrical signal communication with a patch antenna configured as a function of the impedance of said non-ideal switching device.

7. The scanning panel of claim 1, wherein each of said plurality of antenna elements are active antenna elements.

8. The scanning panel of claim 1, wherein said transmit beam pattern and said receive beam pattern are orthogonal elliptical beam patterns and said first array and said second array are complementary arrays.

9. The scanning panel of claim 8, wherein said first array and said second array intersect near a midpoint of each of said first array and said second array.

10. The scanning panel of claim 1, wherein one of said transmit beam pattern and said receive beam pattern is a coarse-spot single-lobed beam pattern and the other is a fine-spot multi-lobed pattern.

11. The scanning panel of claim 10, wherein said first array has an area less than an area of said second array and said first array has a density greater than a density of said second array.

12. The scanning panel of claim 1, wherein said transmit beam pattern and said receive beam pattern are cross-shaped beam patterns rotated 45 degrees with respect to each other.

13. A microwave imaging system, comprising:
a microwave source for providing microwave illumination;
a reflector antenna array including a plurality of antenna elements, each of said antenna elements being capable of being programmed with a respective phase delay to reflect the microwave illumination towards a target in a transmit beam, said antenna elements being further capable of receiving reflected microwave illumination reflected from the target in a receive beam, said reflector antenna array including:
a first array of antenna elements arranged to reflect said transmit beam in a transmit beam pattern, and
a second array of antenna elements arranged to receive said receive beam in a receive beam pattern complementary to said transmit beam pattern; and
a processor operable to measure an intensity of the reflected microwave illumination in said receive beam to form the microwave image of the target at an intersection of said transmit beam and said receive beam, wherein said intersection is the volume-integrated cross-product of said transmit beam and said receive beam.

14. The system of claim 13, wherein said transmit beam pattern and said receive beam pattern are orthogonal elliptical beam patterns and said first array and said second array are complementary arrays.

15. The system of claim 14, wherein said first array and said second array intersect near a midpoint of each of said first array and said second array.

16. The system of claim 15, further comprising a microwave receiver capable of receiving said receive beam reflected from said second array, and wherein said microwave receiver has an aperture different from an aperture of said microwave source.

17. The system of claim 13, wherein one of said transmit beam pattern and said receive beam pattern is a coarse-spot single-lobed beam pattern and the other is a fine-spot multi-lobed pattern.

18. The system of claim 17, further comprising a microwave receiver capable of receiving said receive beam reflected from said second array, and wherein one of said microwave receiver and said microwave source associated with said fine-spot multi-lobed pattern includes a diffractive optical element configured to produce said fine-spot multi-lobed pattern.

19. A method for capturing a microwave image of a target, comprising:
providing a scanning panel including a plurality of antenna elements, each of said antenna elements being programmable with a respective phase delay;
directing a transmit beam of microwave illumination in a transmit beam pattern towards the target from a first away of said plurality of antenna element based on the phase delay of each of the antenna elements therein;
receiving a receive beam of reflected microwave illumination reflected from the target in a receive beam pattern at a second away of said plurality of antenna elements, said receive beam pattern being complementary to said transmit beam pattern; and
capturing the microwave image of the target at an intersection of said transmit beam and said receive beam, wherein said intersection is the volume-integrated cross-product of said transmit beam and said receive beam.

20. The method of claim 19, wherein said directing further includes reflecting the microwave illumination from a microwave source towards the target from said first array.

21. The method of claim 19, wherein said receiving further includes reflecting the reflected microwave illumination from said second array to a microwave receiver.

22. A scanning panel for use in a microwave imaging system to capture a microwave image of a target, comprising:
a plurality of antenna elements, each capable of being programmable with a respective phase delay to direct a transmit beam of microwave illumination toward the target, and each being capable of receiving reflected microwave illumination reflected from the target in a receive beam, said plurality of antenna elements including:
a transmit array of antenna elements arranged to direct the transmit beam of microwave illumination in a transmit beam pattern, and
a receive array of antenna elements arranged to receive the receive beam in a receive beam pattern complementary to said transmit beam pattern;
wherein the microwave image of the target is formed at an intersection of said transmit beam and said receive beam;
wherein said intersection is the volume-integrated cross-product of said transmit beam and said receive beam; and
wherein one of said arrays has an area less than an area of the other of said arrays, and has a density greater than a density of the other of said arrays.

* * * * *

UNITED STATES PATENT AND TRADEMARK OFFICE
CERTIFICATE OF CORRECTION

PATENT NO. : 7,283,085 B2  Page 1 of 1
APPLICATION NO. : 11/088536
DATED : October 16, 2007
INVENTOR(S) : Lee et al.

It is certified that error appears in the above-identified patent and that said Letters Patent is hereby corrected as shown below:

In column 16, line 12, in Claim 19, delete "away" and insert -- array --, therefor.

In column 16, line 16, in Claim 19, delete "away" and insert -- array --, therefor.

Signed and Sealed this

Thirteenth Day of May, 2008

JON W. DUDAS
*Director of the United States Patent and Trademark Office*